United States Patent

Han

(10) Patent No.: US 11,654,829 B2
(45) Date of Patent: May 23, 2023

(54) CAMERA SYSTEM AND METHOD FOR CORRECTING IMAGE THEREOF

(71) Applicants: HYUNDAI MOTOR COMPANY, Seoul (KR); KIA MOTORS CORPORATION, Seoul (KR)

(72) Inventor: Jeong Seok Han, Suwon-si (KR)

(73) Assignees: HYUNDAI MOTOR COMPANY, Seoul (KR); KIA MOTORS CORPORATION ;, Seoul (KR)

( * ) Notice: Subject to any disclaimer, the term of this patent is extended or adjusted under 35 U.S.C. 154(b) by 57 days.

(21) Appl. No.: 15/947,938

(22) Filed: Apr. 9, 2018

(65) Prior Publication Data

US 2019/0161008 A1 May 30, 2019

(30) Foreign Application Priority Data

Nov. 24, 2017 (KR) .......................... 10-2017-0158429

(51) Int. Cl.
*G01B 11/26* (2006.01)
*B60R 1/00* (2022.01)

(52) U.S. Cl.
CPC .......... *B60R 1/00* (2013.01); *B60R 2300/402* (2013.01); *G01B 11/26* (2013.01)

(58) Field of Classification Search
CPC ..... B60R 1/00; B60R 11/04; B60R 2300/402; B60R 2300/802; B60R 2300/105; G01B 11/26
USPC ....................................................... 348/148
See application file for complete search history.

(56) References Cited

U.S. PATENT DOCUMENTS

| | | | |
|---|---|---|---|
| 9,836,060 B2 * | 12/2017 | Ghneim | .................... B60R 1/12 |
| 10,131,270 B2 * | 11/2018 | Asaoka | ................ G01M 11/068 |
| 2010/0266161 A1 * | 10/2010 | Kmiecik | ................ G01C 21/26 382/103 |
| 2011/0050903 A1 * | 3/2011 | Vorobiev | ............... B60D 1/245 348/148 |
| 2015/0266422 A1 * | 9/2015 | Chundrlik, Jr. | ..... G06K 9/00798 348/148 |
| 2017/0120828 A1 * | 5/2017 | Ghneim | .............. B60W 10/184 |
| 2017/0217383 A1 | 8/2017 | Bingle et al. | |
| 2017/0240125 A1 * | 8/2017 | Weigert | ................... B60Q 1/34 |

(Continued)

FOREIGN PATENT DOCUMENTS

| | | |
|---|---|---|
| JP | 2013-20308 A | 1/2013 |
| KR | 10-2016-0041445 A | 4/2016 |

OTHER PUBLICATIONS

Office Action issued in corresponding Korean Patent Application No. 10-2017-0158429 dated Jun. 22, 2021, with English translation.

*Primary Examiner* — Helen Shibru
(74) *Attorney, Agent, or Firm* — Morgan, Lewis & Bockius LLP

(57) ABSTRACT

A camera system includes an image capturing device configured to capture a rear image of a vehicle, a sensor configured to measure a speed of the vehicle, a direction, a height, and an inclination angle of the image capturing device, an image processor configured to convert the rear image by using information measured by the sensor, an attachment mount that is attachable to various locations connected to the vehicle, and a communication device configured to transmit the converted rear image to an audio video navigation (AVN) system of the vehicle.

9 Claims, 5 Drawing Sheets

(56) References Cited

U.S. PATENT DOCUMENTS

| | | | |
|---|---|---|---|
| 2019/0291658 A1* | 9/2019 | Bingle | H04N 5/2254 |
| 2020/0001788 A1* | 1/2020 | Chundrlik, Jr. | G01S 19/45 |
| 2020/0039481 A1* | 2/2020 | Aitidis | B60W 40/02 |
| 2020/0238912 A1* | 7/2020 | Sakakibara | B60R 1/00 |

* cited by examiner

CAMERA SYSTEM AND METHOD FOR CORRECTING IMAGE THEREOF

CROSS-REFERENCE TO RELATED APPLICATION

This application is based on and claims the benefit of priority to Korean Patent Application No. 10-2017-0158429, filed on Nov. 24, 2017, in the Korean Intellectual Property Office, the disclosure of which is incorporated herein in its entirety by reference.

TECHNICAL FIELD

The present disclosure relates to a camera system and a method for correcting an image of a camera system, and more particularly, to a technology of correcting an image provided by a camera that may be attached to various locations.

BACKGROUND

Campers who travel with a vehicle, to which a trailer is connected, are increasing due to an increase of recognition of the importance of leisure thanks to an increase of income.

However, because the trailer is connected to the vehicle by one pin, it is difficult for the driver to predict the locus of the trailer while traveling. Further, if the trailer is mounted on the vehicle, it blinds the field of view of a rear camera, making it impossible to observer the rear side, so that the utility of the rear camera mounted in advance is excluded and the driving of the driver becomes difficult.

In recent years, a rearward movement assisting apparatus of a vehicle that may assist rearward movement of the driver of the trailer by detecting a deflection degree of a joint between the vehicle and the trailer by using an infrared ray sensor and displaying the deflection degree has appeared.

However, the rearward movement assisting apparatus requires a separate infrared ray sensor, which increases costs.

Further, in recent years, a camera has been installed in a trailer connected to a vehicle to secure the field of view of the rear side of the vehicle.

If the camera is installed in the trailer connected to the vehicle, it is difficult to install the camera in another trailer or a boat and it is difficult to adjust the angle of the installed camera.

SUMMARY

The present disclosure provides a camera system which includes a rear camera that may be attached to various locations, and by which the field of view of the driver may be secured through a rear image of the vehicle by correcting the rear image provided by an image processor in the rear camera, and a rear image of a trailer connected to the vehicle as well as a rear image of the vehicle may be provided as the rear camera and an audio video navigation (AVN) system of the vehicle are associated with each other, and a method for correcting an image of a camera system.

The technical objects of the present disclosure are not limited to the above-mentioned one, and the other unmentioned technical objects will become apparent to those skilled in the art from the following description.

In accordance with an aspect of the present disclosure, a camera system includes: an image capturing device configured to capture a rear image of a vehicle; a sensor configured to measure a speed of the vehicle, a direction, a height, and an inclination angle of the image capturing device; an image processor configured to convert the rear image by using information measured by the sensor; an attachment mount that is attachable to various locations connected to the vehicle; and a communication device configured to transmit the converted rear image to an audio video navigation (AVN) system of the vehicle.

The image capturing device may be a rear camera configured to capture the rear image of the vehicle.

The rear camera may be a charge-coupled device (CCD) camera or a complementary metal-oxide semiconductor (CMOS) camera.

The sensor may include a speed sensor, a GPS sensor, and a gyro sensor.

The image processor may determine a rearward direction by using GPS information acquired by the sensor, GPS information of the vehicle, and a speed of the vehicle, and may convert the rear image to correspond to the determined rearward direction.

The image processor may determine a final inclination angle of the camera by comparing an inclination angle of the vehicle measured by using a gyro sensor provided in the AVN system and an inclination angle of the camera measured by using a gyro sensor provided in the sensor, and converts the rear image to correspond to the determined final inclination angle of the camera.

The image processor may determine a height of the camera by using GPS information provided by the sensor and GPS information of the vehicle, and may convert a rear image such that the rear image corresponds to the determined height of the camera.

The attachment mount may be attached to various locations including a trailer connected to the vehicle, a boat, or a load by using a magnetic substance.

The magnetic substance may include a magnet or an electromagnet, and is disposed on a surface of the camera or is disposed inside the camera.

The camera system may further include a battery configured to supply electric power to the camera.

The communication device may transmit the converted rear image to an AVN system of the vehicle by using Wi-Fi communication.

In accordance with another aspect of the present disclosure, a method for correcting an image of a camera system includes: inputting a first image captured by a camera provided in a vehicle; firstly converting the first image captured by the camera to a second image in a rearward direction; determining an inclination angle of the camera from the second image and secondly converting the second image to a third image such that the third image corresponds to the determined inclination angle of the camera, determining a height of the camera from the third image and thirdly converting the third image to a fourth image such that the fourth image corresponds to the determined height of the camera, and outputting the fourth image that is corrected to correspond to the height of the camera.

The step of firstly converting the first image to the second image may include determining the rearward direction by using GPS information provided by the sensor, GPS information of the vehicle, and a speed of the vehicle, and converting the first image to the second image such that the second image corresponds to the determined rearward direction.

The step of secondly converting the second image to the third image may include determining a final inclination angle of the camera by comparing an inclination angle of the vehicle measured by using a gyro sensor of an audio video navigation (AVN) system and an inclination angle of the camera measured by using a gyro sensor of the sensor, and converting the second image to the third such that the third image corresponds to the final inclination angle of the camera.

The step of thirdly converting the third image to the fourth image may include determining the height of the camera by using GPS information provided by the sensor and GPS information acquired by an AVN system, and converting the third image to the fourth image such that the fourth image corresponds to the determined height of the camera.

The method may further include, after the outputting of the fourth image, transmitting the fourth image to an AVN system of the vehicle by using Wi-Fi communication.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
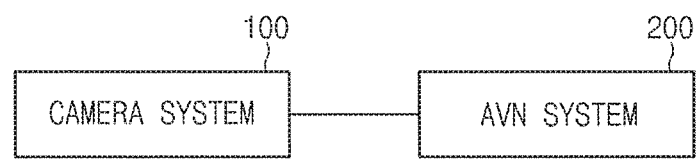
FIG. 1 is a block diagram schematically illustrating a vehicle system according to an embodiment of the present disclosure.

Hereinafter, exemplary embodiments of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

FIG. 1 is a block diagram illustrating a vehicle system according to an embodiment of the present disclosure.

Referring to FIG. 1, the vehicle system 10 includes a camera system 100 and an audio video and navigation (AVN) system 200.

The vehicle system 10 includes a camera system 100 provided in a camera that may be attached to a rear trunk of the vehicle or may be attached to a trailer connected to a rear side of the vehicle and an AVN system 200 provided in the vehicle, and the vehicle system 10 may associate the camera system 100 and the AVN system 200 with each other.

The camera system 100 may be named a camera control system or a camera control unit, and may capture a rear image and correct the captured rear image.

The camera system 100 may be attached to a trunk provided on the rear side of the vehicle or freely attached to a trailer connected to the rear side of the vehicle by using an attachment mount 140. The configuration of the camera system 100 will be described in detail with reference to FIG. 2.

The AVN system 200 is an audio/video/navigation system provided in the vehicle, and transmits and receives an image to and from the camera system 100 by using Wi-Fi communication. For example, in the case of a rearward input (for example, an R-stage input) in the vehicle, the AVN system 200 may determine Wi-Fi connection may be made between the AVN system 200 and the detachable camera.

The AVN system 200 may select a detachable camera (an added camera or a separate camera) or a rear camera of the vehicle, and may display an image by using the detachable camera or display an image by using the rear camera of the vehicle.

Figure 2:
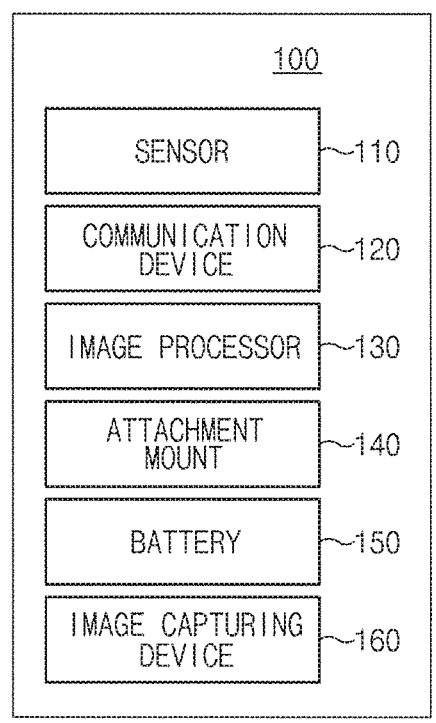
FIG. 2 is a block diagram illustrating a camera system according to an embodiment of the present disclosure.

FIG. 2 is a block diagram illustrating a camera system according to an embodiment of the present disclosure.

Referring to FIG. 2, the camera system 100 according to an embodiment of the present disclosure includes a sensor 110, a communication device 120, an image processor 130, an attachment mount 140, a battery 150, and an image capturing device 160.

The sensor 110 includes a speed sensor (or an acceleration sensor), a GPS sensor, and a gyro sensor, which are simply examples for helping understanding of the present disclosure, and the present disclosure is not limited thereto. For example, the speed sensor may measure a speed (or an acceleration) of the vehicle, the GPS sensor may be provided in a camera to measure an altitude (or a height) of the camera, and the gyro sensor may be provided in the camera to measure an inclination of the camera. Here, the gyro sensor uses kinetics of a rotating object, and may be used when a location of the camera is measured and a direction of the camera is set.

The communication device 120 is a hardware device capable of transmitting and receiving analog or digital signals via wired or wirelessly. The communication device 120 may transmit an image to the AVN system 200 by using Wi-Fi communication, which is simply an example for helping understanding of the present disclosure, and the present disclosure is not limited thereto.

The image processor 130 corrects an image by using the speed sensor (or the acceleration sensor), the GPS sensor, and the gyro sensor of the sensor 110.

The image processor 130 may determine a rearward direction of the vehicle from the image captured by the image capturing device 160. For example, the image processor 130 may determine a rearward direction by using the GPS information provided by the sensor 110 of the camera system 100, the GPS information of the vehicle, and the speed of the vehicle. Here, the GPS information of the vehicle may be provided by the AVN system 200 and may be provided by using a terminal provided in the vehicle, which is simply an example for helping understanding of the present disclosure, and the present disclosure is not limited thereto.

The image processor 130 corrects an image such that the image corresponds to the determined rearward direction of the camera.

The image processor 130 may determine an angle of the camera from the image that has been corrected to correspond to the rearward direction. For example, the image processor 130 may determine the angel of the camera by using a gyro sensor of the sensor 110. For example, the image processor 130 may receive an inclination angle of the vehicle by using the gyro sensor provided in the AVN system 200 of the vehicle, and may determine a final inclination angle of the camera by comparing the received inclination angle of the vehicle and an inclination angle of the camera measured by using the gyro sensor of the sensor 110 in the camera system 100.

The image processor 130 corrects an image such that the image corresponds to the determined final inclination angle of the camera.

The image processor 130 may determine a height of the camera in the image that is corrected to correspond to the final inclination angle of the camera. For example, the image processor 130 may determine a height of the camera by using GPS information provided by the sensor 110 in the camera system 100 and GPS information provided by the AVN system 200.

The image processor 130 corrects an image such that the image corresponds to the height of the camera.

The attachment mount 140 may attach the camera to various locations including a trailer connected to the vehicle, a boat, or a load by using a magnetic substance. For example, the magnetic substance refers to a magnetic material, and may be a material that is magnetized in a magnetic field. In particular, a ferromagnetic substance is a magnetic substance having strong magnetism due to magnetic moments of atoms, a paramagnetic substance is a magnetic substance that is magnetized disorderly due to thermal vibration of atoms, and a diamagnetic substance is a magnetic body that is magnetized in a direction that is opposite to an external magnetic field.

The attachment mount 140 may be a magnetic substance including a magnet or an electromagnet. For example, the magnetic substance may be buried on a surface of or in the interior of the camera, and may be buried on a surface of or in the interior of an object including a trailer connected to the vehicle, a boat, or a load.

The battery 150 supplies electric power to the camera system 100 provided in the camera. For example, the battery 150 may supply electric power to the camera system 100 in the case of a rearward input (for example, an R-stage input) of the vehicle, which is simply an example for helping understanding of the present disclosure, and the present disclosure is not limited thereto.

The image capturing device 160 captures an image including a front side, a lateral side, and a rear side of the vehicle, and the image capturing device 160 according to an embodiment of the present disclosure refers to a rear camera connected to an object including a trailer connected to the rear side of the vehicle or a trunk of the vehicle, a boat, or a load. For example, the rear camera may be a charge-coupled device (CCD) camera or a complementary metal-oxide semiconductor (CMOS) camera that photographs information on the rear side of the vehicle, a road, or an obstacle, and may be various types of cameras.

In an exemplary embodiment of the present disclosure, the image processor 130 may be a specialized digital signal processor (DSP) used for image processing in digital cameras, mobile phones, or other devise.

Figure 3:
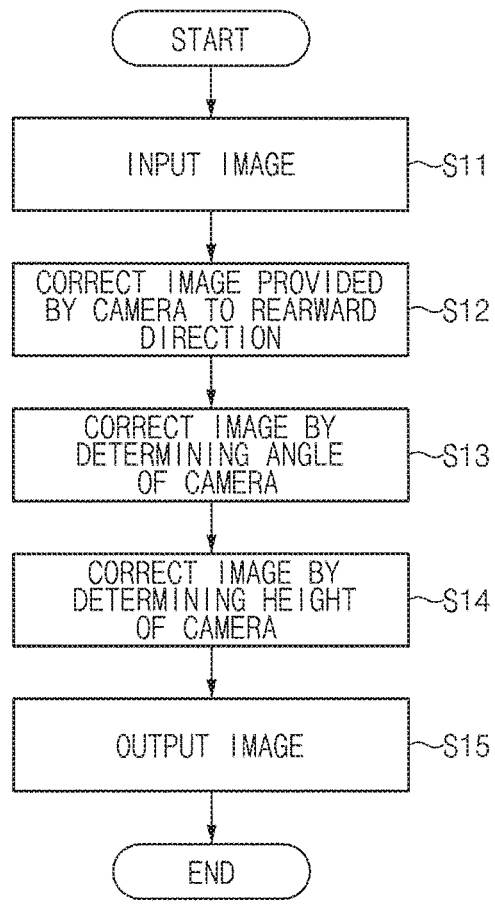
FIG. 3 is a view for explaining an image processor in a camera system according to an embodiment of the present disclosure.

FIG. 3 is a view for explaining an image processor in a camera system according to an embodiment of the present disclosure.

Referring to FIG. 3, operations S11 to S15 of the method for correcting an image by the image processor 130 according to an embodiment of the present disclosure will be described in detail with reference to FIG. 2.

In operations S11 and S12, if an image captured by the camera of the image capturing device 160 is input, the image processor 130 corrects the image captured by the camera such that the image corresponds to a rearward direction. For example, the image processor 130 may determine a rearward direction by using the GPS information provided by the sensor 110 of the camera system 100, the GPS information (for example, map data) of the vehicle, and the speed of the vehicle, and may correct the image captured by the camera such that the image corresponds to the rearward direction.

In operation S13, in the image that is corrected to correspond to the rearward direction, the image processor 130 determines an angle of the camera and corrects the image such that the image corresponds to the determined angle of the camera. For example, the image processor 130 may determine the angel of the camera by using a gyro sensor of the sensor 110. For example, the image processor 130 may receive an inclination angle of the vehicle by using the gyro sensor provided in the AVN system 200 of the vehicle, and may determine a final inclination angle of the camera by comparing the received inclination angle of the vehicle and an inclination angle of the camera measured by using the gyro sensor of the sensor 110 in the camera system 100, and may correct the image such that the image corresponds to a final inclination angle of the camera.

In operation S14, in the image that is corrected to correspond to the final inclination angle of the camera, the image processor 130 determines a height of the camera and corrects the image such that the image corresponds to the determined height of the camera. For example, the image processor 130 may determine a height of the camera by using GPS information provided by the sensor 110 in the camera system 100 and GPS information provided by the AVN system 200, and may correct an image such that the image corresponds to the height of the camera.

In operation S15, the image processor 130 outputs the corrected image. After the operation of outputting the corrected image, the image processor 130 may transmit the corrected image to the AVN system 200 of the vehicle by using Wi-Fi communication.

Figure 4:
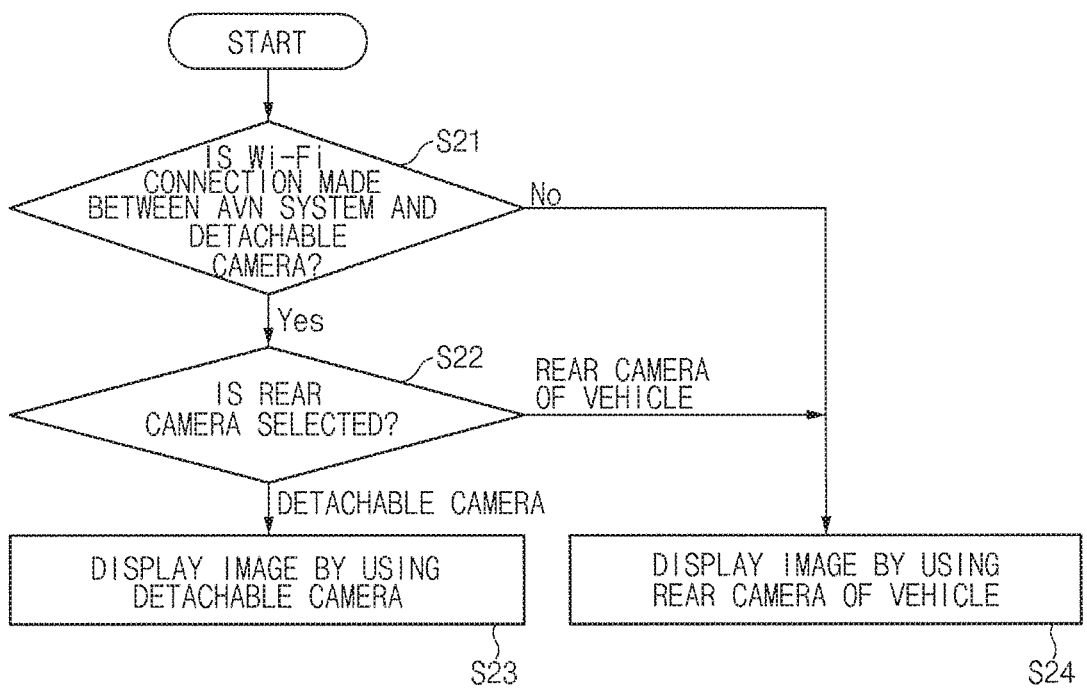
FIG. 4 is a view for explaining an AVN system of a vehicle associated with a camera system according to an embodiment of the present disclosure.

FIG. 4 is a view for explaining an AVN system of a vehicle associated with a camera system according to an embodiment of the present disclosure.

Referring to FIG. 4, in the camera system 100 and the method for correcting an image of the camera system 200 according to an embodiment of the present disclosure, operations S21 to S24 will be described in detail with reference to FIG. 1 for the operation process of the AVN system 200 of the vehicle associated with the camera system 100.

In operations S21 and S22, in the case of a rearward input (for example, an R-stage input), the AVN system 200 determines whether Wi-Fi connection may be made between the AVN system 200 and the detachable camera (the attachable rear camera). For example, the detachable camera may be a rear camera of the vehicle, and may be a camera (an added camera or a separate camera) that may be attached to various locations including a trailer connected to the vehicle, a boat, or a load. A plurality of detachable cameras may be provided to correspond to an object connected to the vehicle, which is simply an example for helping understanding of the present disclosure, and the present disclosure is not limited thereto.

In operations S23 and S24, when Wi-Fi connection to the detachable camera may be made, the detachable camera or the rear camera of the vehicle may be selected by the driver, and the AVN system 200 may display an image by using the detachable camera or may display an image by using the rear camera of the vehicle. For example, the device that displays an image may be a navigation device of the AVN system 200, or may be a head-up display (HUD).

Figure 5:
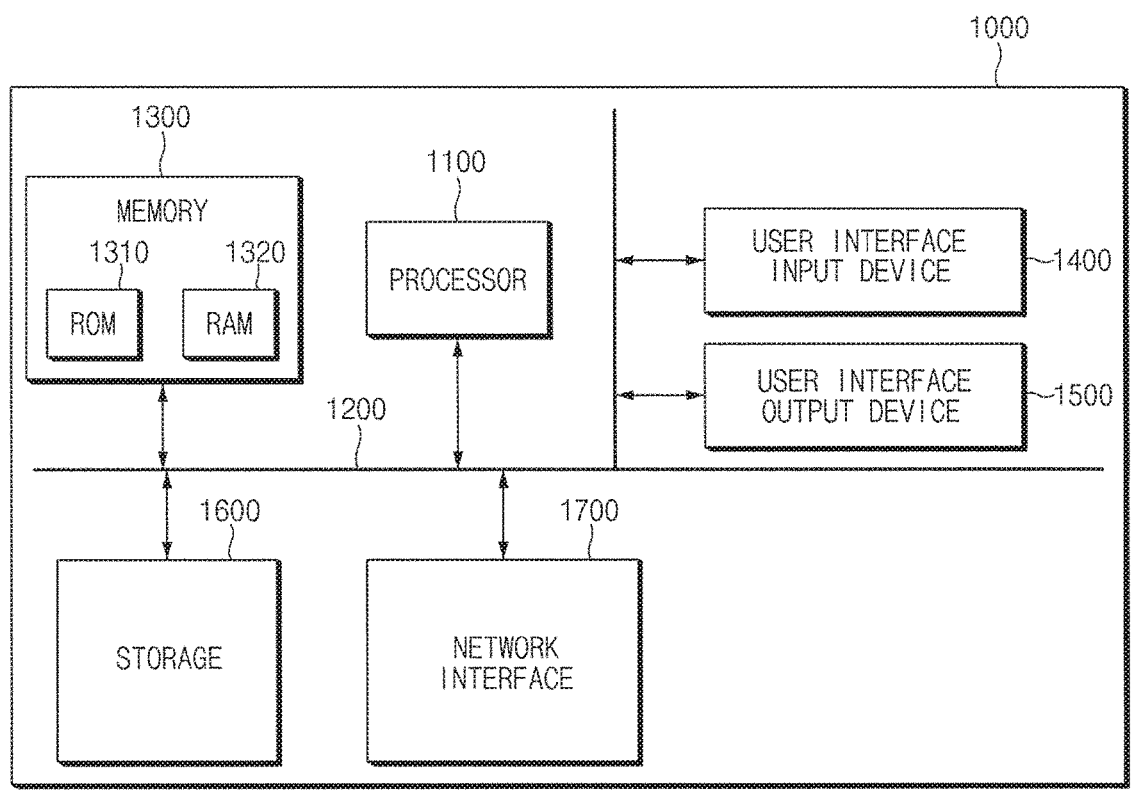
FIG. 5 is a view illustrating a computing system for executing a method for correcting an image of a camera system according to an embodiment of the present disclosure.

FIG. 5 is a view illustrating a computing system for executing a method for correcting an image of a camera system according to an embodiment of the present disclosure.

Referring to FIG. 5, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the camera system and the method for correcting an image of a camera system according to the present disclosure, the field of view of the driver may be secured through a rear image of the vehicle by correcting the rear image provided by the image processor in the rear camera, and a rear image of the trailer connected to the vehicle as well as a rear image of the vehicle may be provided as the rear camera and the AVN system of the vehicle are associated with each other.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A camera system comprising:
   an image capturing device configured to capture a rear image of a vehicle;
   a sensor configured to measure a speed of the vehicle, a direction, a height, and an inclination angle of a lens of the image capturing device;
   an image processor configured to convert the rear image by using information acquired from the sensor;
   an attachment mount that is attachable to various locations connected to the vehicle; and
   a wireless communication device configured to transmit the converted rear image to an audio video navigation (AVN) system of the vehicle,
   wherein the image processor is configured to convert the rear image to correspond to a rearward direction,
   wherein the image processor determines a final inclination angle of the image capturing device from the converted rear image to correspond to a rearward direction by comparing an inclination angle of the vehicle measured by using a gyro sensor of the AVN system and the inclination angle of the image capturing device measured by using a gyro sensor of the sensor, and converts the rear image to correspond to the determined final inclination angle of the image capturing device,
   wherein the image processor determines a height of the image capturing device from the converted rear image to correspond to the determined final inclination angle of the image capturing device by using GPS information acquired by the sensor and GPS information of the vehicle, and corrects the rear image by converting the rear image to correspond to the determined height of the image capturing device.

2. The camera system of claim 1, wherein the image capturing device is a rear camera configured to capture the rear image of the vehicle.

3. The camera system of claim 2, wherein the rear camera is a charge-coupled device (CCD) camera or a complementary metal-oxide semiconductor (CMOS) camera.

4. The camera system of claim 1, wherein the sensor includes a speed sensor, a GPS sensor, and a gyro sensor.

5. The camera system of claim 1, wherein the image processor determines a rearward direction by using GPS information from the sensor, GPS information of the vehicle, and a speed of the vehicle, and converts the rear image to correspond to the determined rearward direction.

6. The camera system of claim 1, wherein the attachment mount is provided in plural so that a plurality of attachment mounts attached to various locations including a trailer connected to the vehicle, a boat, or a load by using a magnetic substance.

7. The camera system of claim 6, wherein the magnetic substance includes a magnet or an electromagnet, and is disposed on a surface of the image capturing device or is disposed inside the image capturing device.

8. The camera system of claim 1, further comprising: a battery configured to supply electric power to the image capturing device.

9. The camera system of claim 1, wherein the wireless communication device transmits the converted rear image to the AVN system of the vehicle by using Wi-Fi communication.

\* \* \* \* \*